US012601636B2

(12) United States Patent
Takahashi et al.

(10) Patent No.: US 12,601,636 B2
(45) Date of Patent: Apr. 14, 2026

(54) INFRARED SENSOR DEVICE

(71) Applicant: Mitsubishi Electric Corporation, Tokyo (JP)

(72) Inventors: Yoshinori Takahashi, Tokyo (JP); Tomohiro Maegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 574 days.

(21) Appl. No.: 17/995,830

(22) PCT Filed: Aug. 18, 2020

(86) PCT No.: PCT/JP2020/031151
§ 371 (c)(1),
(2) Date: Oct. 7, 2022

(87) PCT Pub. No.: WO2022/038681
PCT Pub. Date: Feb. 24, 2022

(65) Prior Publication Data
US 2023/0145676 A1     May 11, 2023

(51) Int. Cl.
*G01J 5/12* (2006.01)
(52) U.S. Cl.
CPC ........... *G01J 5/12* (2013.01); *G01J 2005/123* (2013.01)
(58) Field of Classification Search
CPC .... G01J 5/061; G01J 5/064; G01J 5/20; G01J 5/022; G01J 2005/123; G01J 2005/062; G01J 2005/063; G01J 2005/202; G01J 2005/066
USPC ........................................................ 374/121
See application file for complete search history.

(56) References Cited

U.S. PATENT DOCUMENTS

| | | | |
|---|---|---|---|
| 6,649,913 B1 | 11/2003 | Kennedy et al. | |
| 2006/0289418 A1* | 12/2006 | Konishi | H05B 3/04 219/216 |
| 2012/0074238 A1* | 3/2012 | Morita | F02D 29/04 237/5 |
| 2013/0327944 A1 | 12/2013 | Ernst et al. | |

(Continued)

FOREIGN PATENT DOCUMENTS

| | | |
|---|---|---|
| JP | 2002-310783 A | 10/2002 |
| JP | 2003-254824 A | 9/2003 |
| JP | 2006-170940 A | 6/2006 |

(Continued)

OTHER PUBLICATIONS

An Office Action mailed by China National Intellectual Property Administration on Jul. 31, 2025, which corresponds to Chinese Patent Application No. 202080102535.3 and is related to U.S. Appl. No. 17/995,830; with English language translation.

(Continued)

*Primary Examiner* — Peter J Macchiarolo
*Assistant Examiner* — Mireille S Sadate-Moualeu
(74) *Attorney, Agent, or Firm* — Studebaker Brackett PLLC

(57) ABSTRACT

A sensor chip (4) having a pixel unit (8) that detects an infrared ray is bonded to an insulating substrate (2) using a bonding material (3). A heat generation mechanism (11) is integrated with the sensor chip (4). A control unit (14) is provided on the insulating substrate (2) and controls an amount of current to be supplied to the heat generation mechanism (11).

9 Claims, 13 Drawing Sheets

(56) References Cited

U.S. PATENT DOCUMENTS

2020/0191655 A1    6/2020  Carr

FOREIGN PATENT DOCUMENTS

| | | | |
|---|---|---|---|
| JP | 2010283514 | A * | 12/2010 |
| JP | 2012173156 | A * | 9/2012 |
| JP | 2012-225717 | A | 11/2012 |
| JP | 2014-506669 | A | 3/2014 |

OTHER PUBLICATIONS

An Office Action; mailed by the China National Intellectual Property Administration of the People's Republic of China on Jun. 19, 2025, which corresponds to Chinese Patent Application No. 202080102535.3 and is related to U.S. Appl. No. 17/995,830.

The extended European search report issued by the European Patent Office on Aug. 30, 2023, which corresponds to European Patent Application No. 20950247.5-1020 and is related to U.S. Appl. No. 17/995,830.

An Office Action; mailed by the China National Intellectual Property Administration of the People's Republic of China on Mar. 7, 2025, which corresponds to Chinese Patent Application No. 202080102535.3 and is related to U.S. Appl. No. 17/995,830.

An Office Action mailed by China National Intellectual Property Administration on Nov. 17, 2025, which corresponds to Chinese Patent Application No. 202080102535.3 and is related to U.S. Appl. No. 17/995,830; with English language translation.

* cited by examiner

INFRARED SENSOR DEVICE

FIELD

The present disclosure relates to an infrared sensor device.

BACKGROUND

In a conventional infrared sensor device, an entire sensor has been controlled to a predetermined temperature by a Peltier element to improve a measurement accuracy (e.g., see, Patent Literature 1).

CITATION LIST

Patent Literature

[Patent Literature 1] JP 2012-225717 A

SUMMARY

Technical Problem

However, the Peltier element is a separate member from a sensor chip, and is attached to the sensor chip from outside. Accordingly, the temperature of the sensor chip cannot be precisely controlled, and the measurement accuracy cannot be sufficiently improved.

The present disclosure has been made to solve the above-described problem, and aims at obtaining an infrared sensor device capable of sufficiently improving a measurement accuracy.

Solution to Problem

An infrared sensor device according to the present disclosure includes: an insulating substrate; a sensor chip bonded to the insulating substrate using a bonding material and having a pixel unit that detects an infrared ray; a heat generation mechanism integrated with the sensor chip; and a control unit provided on the insulating substrate and controlling an amount of current to be supplied to the heat generation mechanism.

Advantageous Effects of Invention

In the present disclosure, the heat generation mechanism is integrated with the sensor chip. When the amount of current to be supplied to the heat generation mechanism is controlled, the temperature of the sensor chip can be precisely controlled. As a result, a measurement accuracy can be sufficiently improved.

DESCRIPTION OF EMBODIMENTS

An infrared sensor device according to the embodiments of the present disclosure will be described with reference to the drawings. The same components will be denoted by the same symbols, and the repeated description thereof may be omitted.

Embodiment 1

Figure 1:
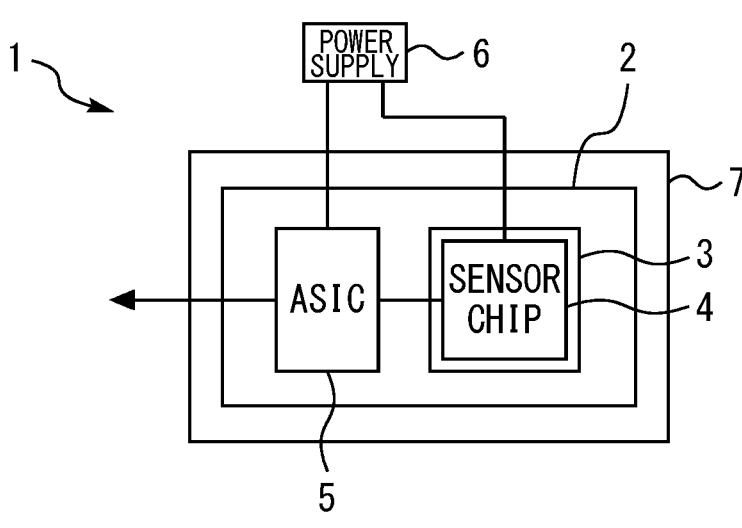
FIG. 1 is a diagram illustrating an infrared sensor device according to an embodiment 1.

FIG. 1 is a diagram illustrating an infrared sensor device according to an embodiment 1. An infrared sensor device 1 is attached to an air conditioner, for example, and detects a temperature inside a room or a location of a person inside the room with infrared rays. The infrared sensor device 1 includes an insulating substrate 2, a sensor chip 4 bonded to the insulating substrate 2 using a bonding material 3, and an ASIC 5 formed on the insulating substrate 2. The ASIC 5 outputs an infrared detection result of the sensor chip 4 to outside. Power is supplied to the sensor chip 4 and the ASIC 5 from a power supply 6.

The insulating substrate 2 is housed in a case 7 of the air conditioner, for example. A main body and the case 7 of the air conditioner are each composed of plastic. The insulating substrate 2 is a glass epoxy substrate, for example. Examples of the bonding material 3 include a die bonding material of a silicon adhesive or an Ag paste. These members each have a large thermal resistance and thermal capacitance. A thermal resistance between the insulating substrate 2 and the case 7 is large. Therefore, even if each of the sensor chip 4 and the ASIC 5 generates heat when the infrared sensor device 1 operates, the heat is not easily radiated. The heat from the ASIC 5 that has been generated earlier when the infrared sensor device is started up is not easily transmitted to the sensor chip 4. Accordingly, it has conventionally taken time until the temperature of the sensor chip 4 is stabilized so that an output level and a characteristic of the infrared sensor device are stabilized.

Figure 2:
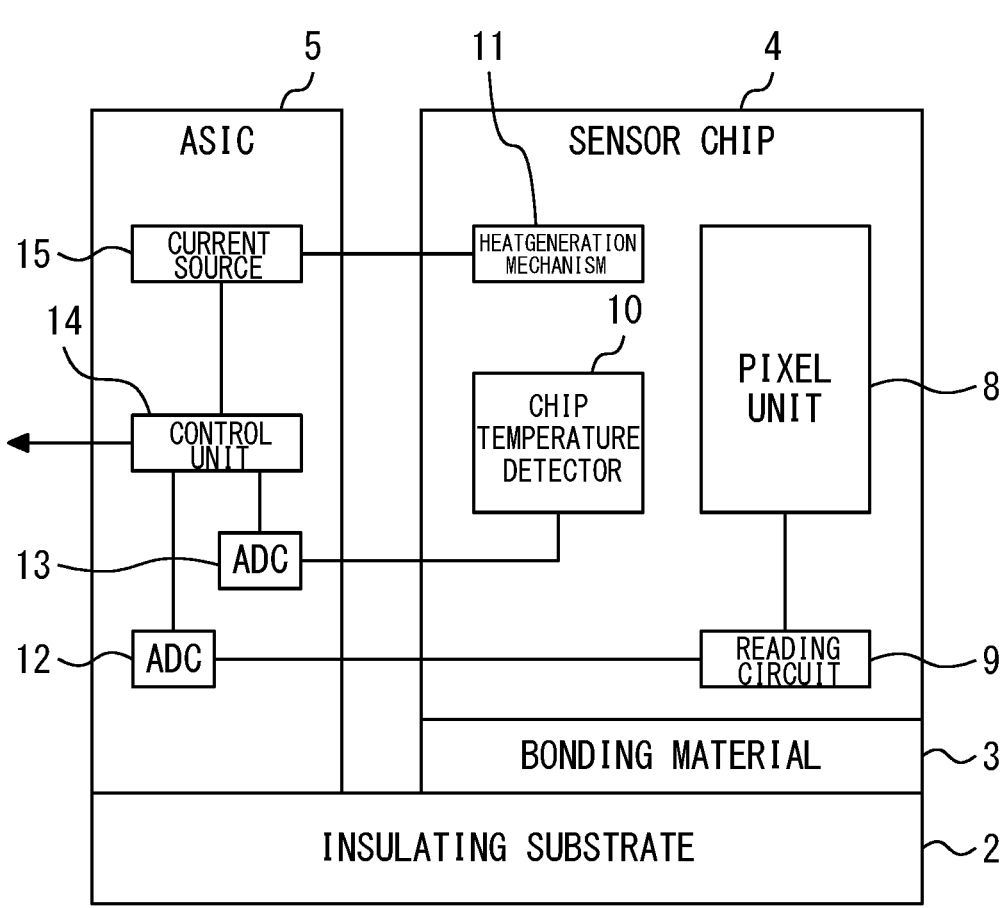
FIG. 2 is a diagram illustrating an internal configuration of the infrared sensor device according to the embodiment 1.

FIG. 2 is a diagram illustrating an internal configuration of the infrared sensor device according to the embodiment 1. The sensor chip 4 is a solid-state image sensor having a pixel unit 8 that detects infrared rays. A reading circuit 9, a chip temperature detector 10, and a heat generation mechanism 11 are integrated with the sensor chip 4. The reading circuit 9 reads out signals one by one from a plurality of pixels included in the pixel unit 8. The chip temperature detector 10 detects the temperature of the sensor chip 4.

The ASIC 5 includes A-D converters 12 and 13, a control unit 14, and a current source 15. The A-D converter 12 converts an output signal of the reading circuit 9 into a digital signal. The control unit 14 receives an output signal from the A-D converter 12, and outputs the output signal to outside as an infrared detection result.

The A-D converter 13 converts an output signal of the chip temperature detector 10 into a digital signal. The control unit 14 performs calculation in response to an output signal of the A-D converter 13. The current source 15 applies to the heat generation mechanism 11 a variable current determined based on a calculation result of the control unit 14. Thus, the control unit 14 controls an amount of current to be supplied to the heat generation mechanism 11 in response to an output of the chip temperature detector 10.

Figure 3:
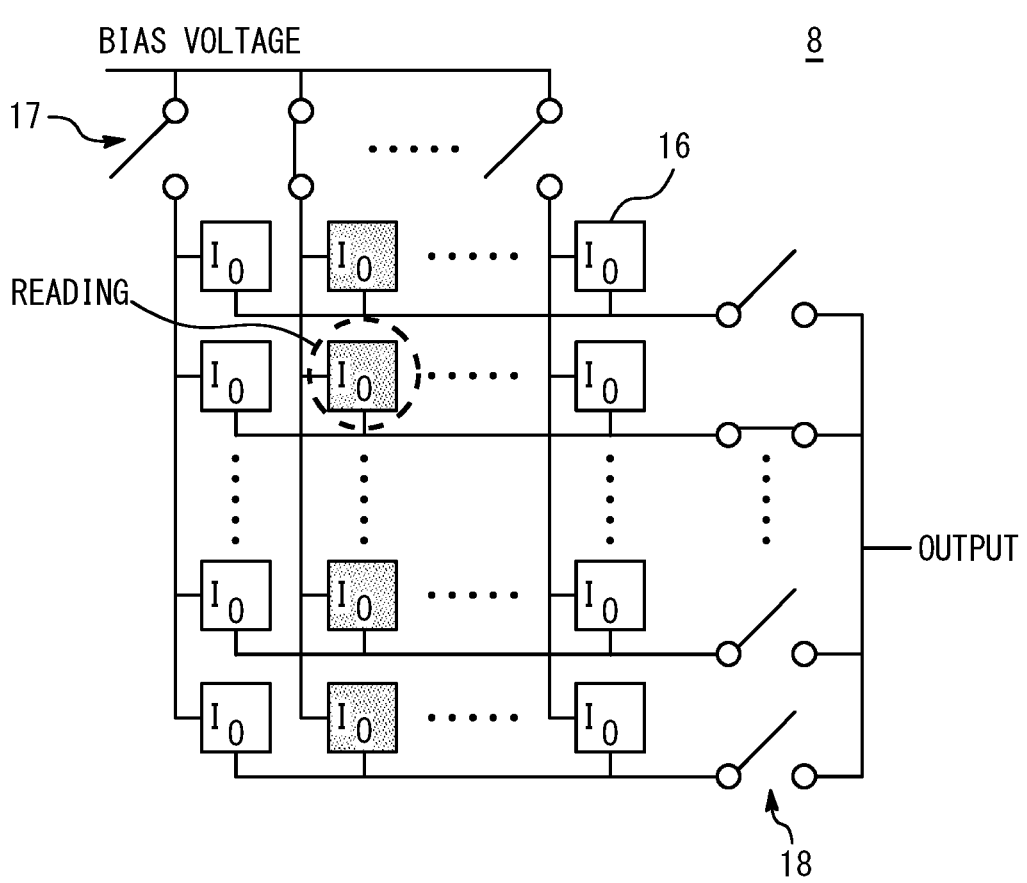
FIG. 3 is a diagram illustrating a pixel unit.

FIG. 3 is a diagram illustrating a pixel unit. In the pixel unit 8, a plurality of pixels 16 are arranged in a matrix shape. A bias voltage is applied to the pixels 16 in a column selected by a column selection switch 17, and a current flows through the pixels 16 in the column. A current value of the pixel 16 selected by a row selection switch 18 is read out.

Figure 4:
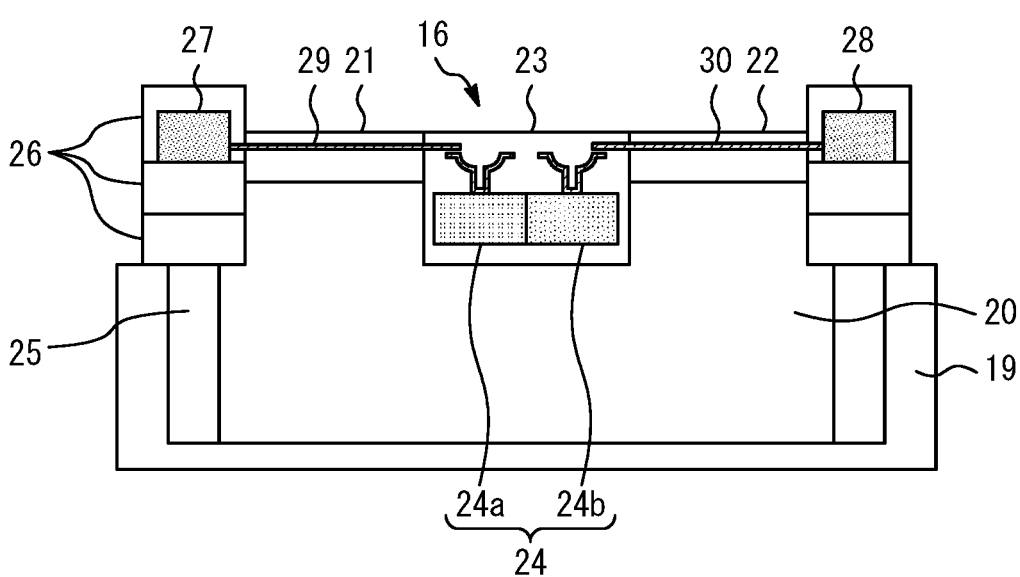
FIG. 4 is a cross-sectional view illustrating a pixel.

FIG. 4 is a cross-sectional view illustrating a pixel. A concave cavity 20 is formed by etching in a silicon substrate 19. The pixel 16 is held by support legs 21 and 22 above the cavity 20. Therefore, the pixel 16 is hollow insulated from the silicon substrate 19. The pixel 16 includes an insulating film 23 and a PN diode 24 provided in an inner portion of the insulating film 23. Insulating films 26 are formed on respective trench structures 25. Signal lines 27 and 28 are formed in the respective insulating films 26. A P-type layer 24a and an N-type layer 24b of a PN diode 24 are respectively connected to the signal lines 27 and 28 via thin film metal wirings 29 and 30 in the support legs 21 and 22. The PN diode 24 is a thermosensor that changes in electrical characteristic depending on a temperature, and converts a temperature change due to incident infrared rays into an electrical signal. The PN diode may be replaced with another thermosensor such as a resistor.

Figure 5:
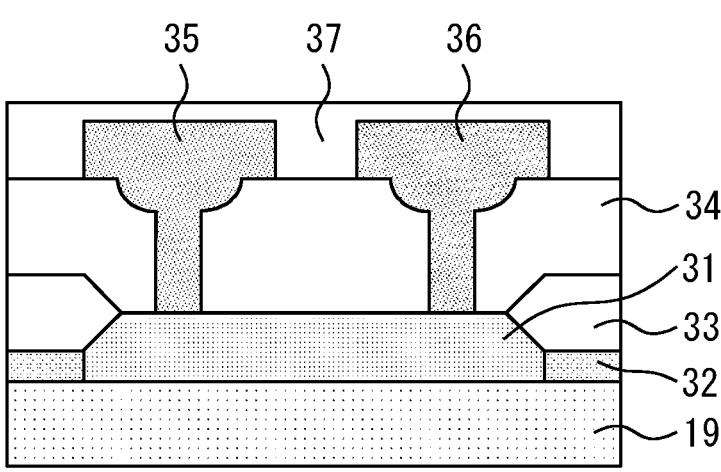
FIG. 5 is a cross-sectional view illustrating an example of a heat generation mechanism.

FIG. 5 is a cross-sectional view illustrating an example of a heat generation mechanism. A resistor 31 is an N⁺-type diffusion layer formed by implanting impurities into a surface of the silicon substrate 19. The resistor 31 provides the heat generation mechanism 11. The silicon substrate 19 is of a P type and has a relatively high resistance. A P⁺-type diffusion layer 32 is formed around the resistor 31 to reduce a resistance value of a P-type region around the resistor 31 and stabilize a potential around the resistor 31.

A field oxide film 33 is formed on the P⁺-type diffusion layer 32. An insulating film 34 is formed on the resistor 31 and the field oxide film 33. Metal wirings 35 and 36 are respectively connected to one end and the other end of the resistor 31 by penetrating through the insulating film 34. The insulating film 37 covers the insulating film 34 and the metal wirings 35 and 36.

An N⁺-type diffusion layer of the resistor 31 is formed simultaneously with an N⁺-type diffusion layer in a source-drain region of an N-type MOSFET in the column selection switch 17 or the row selection switch 18, for example. Therefore, both the diffusion layers are the same in diffusion depth, impurity concentration, impurity type, and the like. However, the resistor 31 may be a diffusion layer formed simultaneously with a P-type layer of a p-type MOSFET or the P-type layer 24a or the N-type layer 24b in the pixel 16, for example, depending on a desired resistance value or temperature characteristic.

Figure 6:
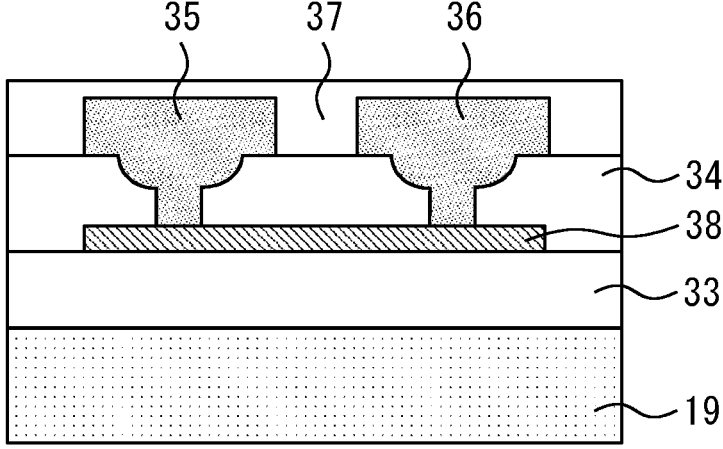
FIG. 6 is a cross-sectional view illustrating another example of the heat generation mechanism.

FIG. 6 is a cross-sectional view illustrating another example of the heat generation mechanism. A field oxide film 33 is formed on a silicon substrate 19. A resistor 38 is formed on the field oxide film 33. The resistor 38 provides the heat generation mechanism 11. An insulating film 34 is formed on the resistor 31 and the field oxide film 33. Metal wirings 35 and 36 are respectively connected to one end and the other end of the resistor 38 by penetrating through the insulating film 34. An insulating film 37 covers the insulating film 34 and the metal wirings 35 and 36. The resistor 38 is formed simultaneously with a gate wiring of a MOSFET in a column selection switch 17 or a row selection switch 18. Therefore, the resistor 38 is composed of polysilicon having the same thickness and impurity concentration as those of the gate wiring.

Figures 7, 8:
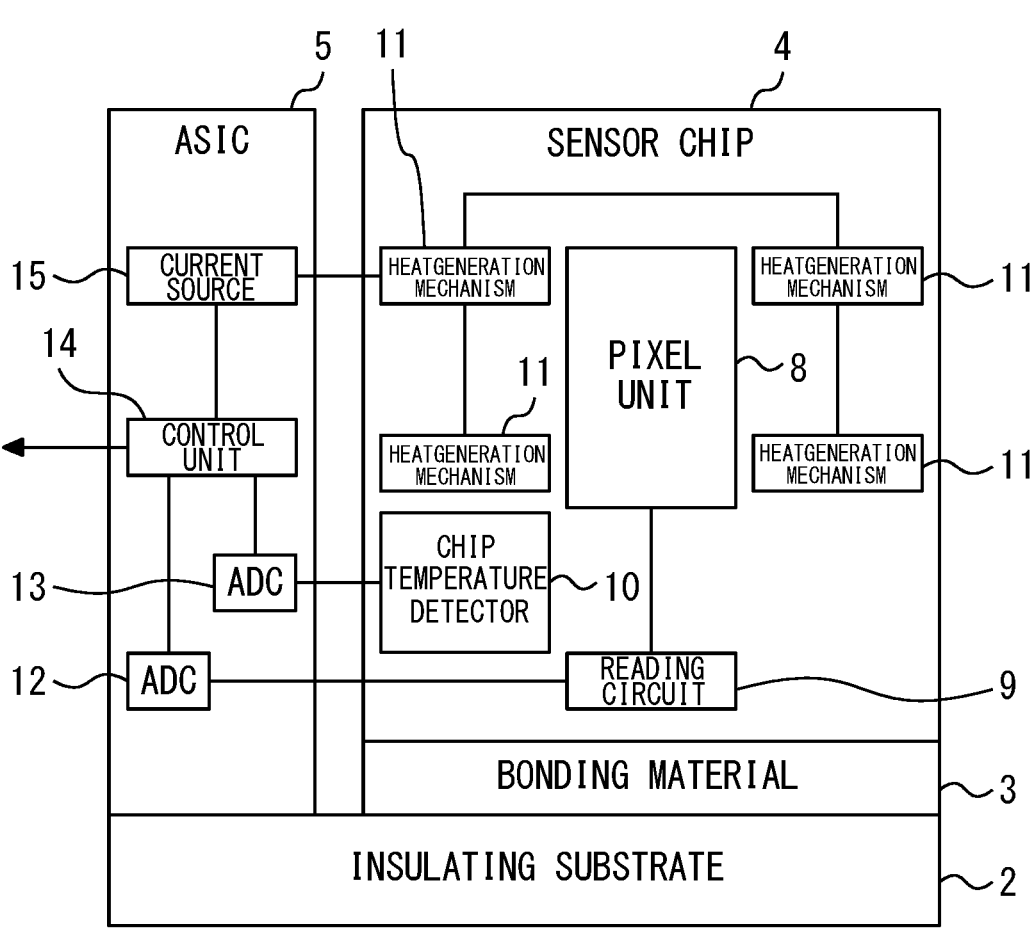
FIG. 7 is a diagram illustrating a change in temperature of the sensor chip according to the embodiment 1.
FIG. 8 is a diagram illustrating an internal configuration of an infrared sensor device according to an embodiment 2.

FIG. 7 is a diagram illustrating a change in temperature of the sensor chip according to the embodiment 1. Immediately after power is turned on, the temperature of the pixel unit 8 is lower than a desired stable temperature. Accordingly, the control unit 14 increases an amount of current to be supplied to the heat generation mechanism 11. This makes it possible to shorten a time period elapsed until the temperature of the pixel unit 8 reaches a stable temperature. When an environmental temperature increases at time Ta, the temperature of the pixel unit 8 also increases. The control unit 14 reduces the amount of current to be supplied to the heat generation mechanism 11. Therefore, the temperature of the pixel unit 8 returns to the stable temperature.

As described above, in the present embodiment, the heat generation mechanism 11 is integrated with the sensor chip 4. When the amount of current to be supplied to the heat generation mechanism 11 is controlled, the temperature of the sensor chip 4 can be precisely controlled. As a result, a measurement accuracy can be sufficiently improved.

The temperature of the sensor chip 4 changes depending on heat generation at the time of a device operation, a change in outside air temperature, a change in how to be exposed to direct sunlight, and the like. When the temperature of the sensor chip 4 changes, a characteristic such as an output level or a sensitivity of the infrared sensor device changes. The control unit 14 supplies a current to the heat generation mechanism 11 when an output of the chip temperature detector 10 is below a reference value, and stops supplying a current to the heat generation mechanism 11 when the output of the chip temperature detector 10 exceeds the reference value. This makes it possible to make the temperature of the sensor chip 4 constant. Therefore, the output level of the infrared sensor device becomes constant, resulting in stabilized image quality and characteristic. This makes it possible to shorten a time period elapsed until an output of the infrared sensor device is stabilized.

Although the stable temperature of the sensor chip 4 is 27° C., for example, the stable temperature changes depending on the outside air temperature. Correspondingly, the control unit 14 also changes the reference value of the output of the chip temperature detector 10 used to control the amount of current to be supplied to the heat generation mechanism 11.

Embodiment 2

FIG. 8 is a diagram illustrating an internal configuration of an infrared sensor device according to an embodiment 2. In the present embodiment, a plurality of heat generation mechanisms 11 are arranged around a pixel unit 8 in a surface of a sensor chip 4. An ASIC 5 individually controls an amount of current to be supplied to each of the plurality of heat generation mechanisms 11.

When the infrared sensor device is started up, heat is transmitted from the ASIC 5 so that a temperature in the surface of the sensor chip 4 varies. At the time of the startup, a control unit 14 makes an amount of current to be supplied to the heat generation mechanism 11 arranged far from the ASIC 5 greater than an amount of current to be supplied to the heat generation mechanism 11 arranged close to the ASIC 5. As a result, the variation in the temperature in the chip surface is alleviated, thereby making it possible to further shorten a time period elapsed until an output of the infrared sensor device is stabilized.

Embodiment 3

Figure 9:
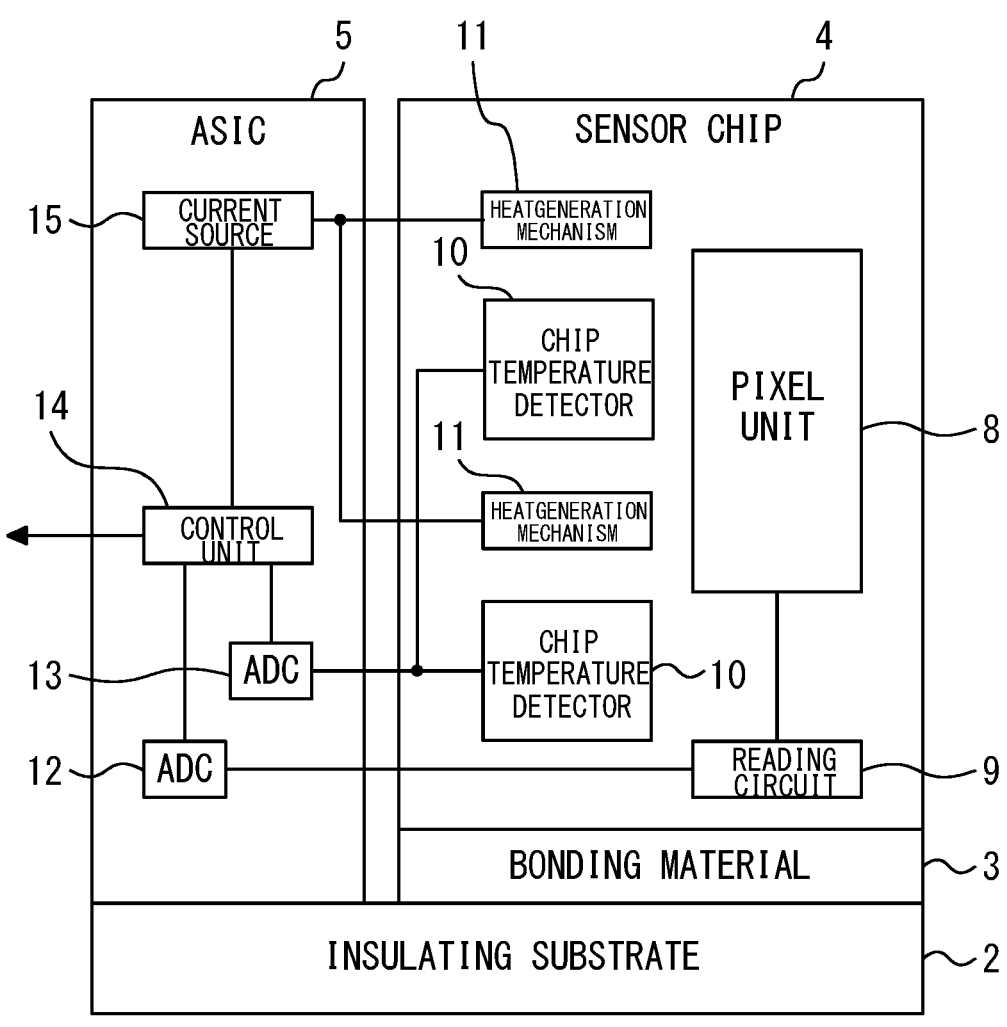
FIG. 9 is a diagram illustrating an internal configuration of an infrared sensor device according to an embodiment 3.

FIG. 9 is a diagram illustrating an internal configuration of an infrared sensor device according to an embodiment 3. In the present embodiment, a plurality of pairs of heat generation mechanisms 11 and chip temperature detectors 10 are arranged around a pixel unit 8 in a surface of a sensor chip 4. Therefore, a temperature distribution in the chip surface can be detected. The control unit 14 individually controls an amount of current to be supplied to each of the plurality of heat generation mechanisms 11 in response to an output of the corresponding chip temperature detector 10. As a result, a variation in temperature in the chip surface is alleviated, thereby making it possible to further shorten a time period elapsed until an output of the infrared sensor device is stabilized.

Embodiment 4

Figure 10:
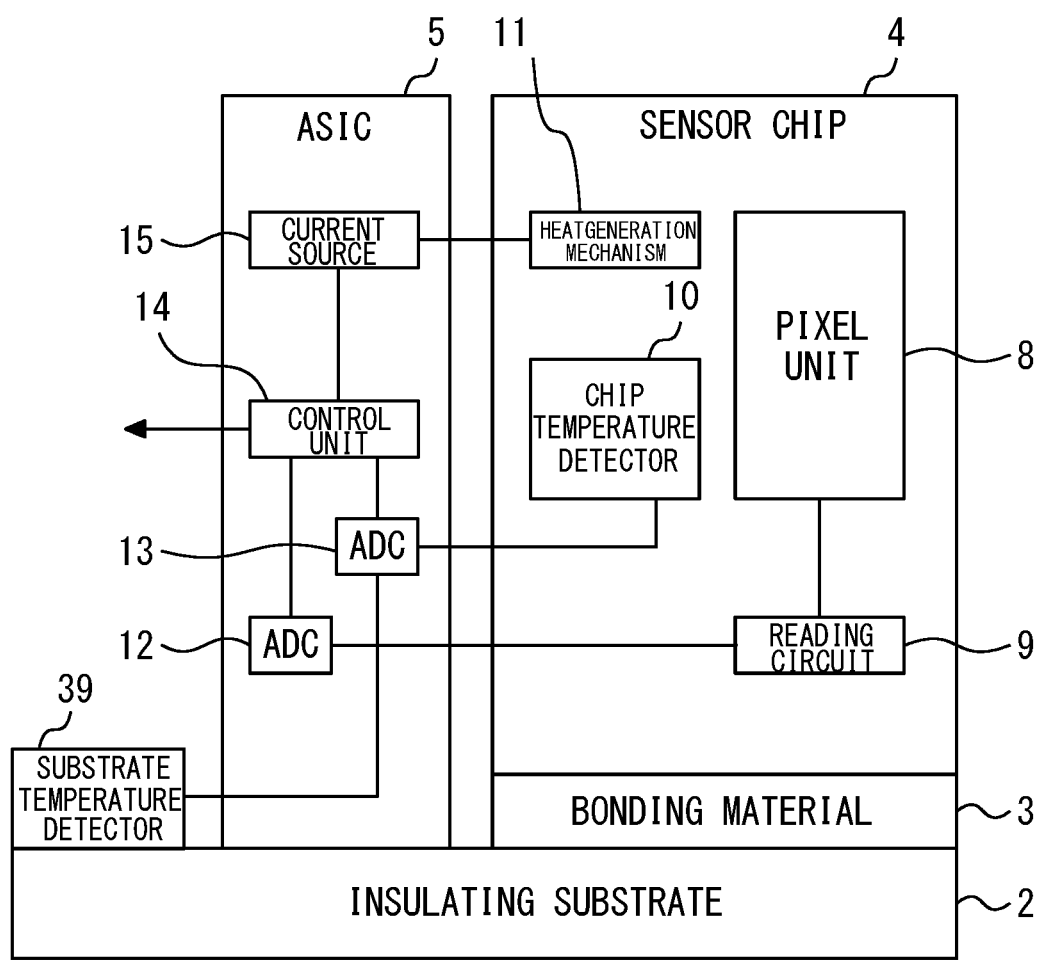
FIG. 10 is a diagram illustrating an internal configuration of an infrared sensor device according to an embodiment 4.

FIG. 10 is a diagram illustrating an internal configuration of an infrared sensor device according to an embodiment 4. When there has been a change in outside air temperature, heat generation of an insulating substrate 2, or a change in how to be exposed to direct sunlight, for example, the temperature of the insulating substrate 2 changes prior to a sensor chip 4. In the present embodiment, a substrate temperature detector 39 that detects the temperature of the insulating substrate 2 is provided in the insulating substrate 2. A control unit 14 controls an amount of current to be supplied to a heat generation mechanism 11 in response to an output of the substrate temperature detector 39. As a result, even when the outside air temperature or the like has sharply changed, a change in temperature of the sensor chip 4 is predicted so that the amount of current to be supplied to the heat generation mechanism 11 can be controlled. Therefore, it is possible to further shorten a time period elapsed until an output of the infrared sensor device is stabilized.

Embodiment 5

Figure 11:
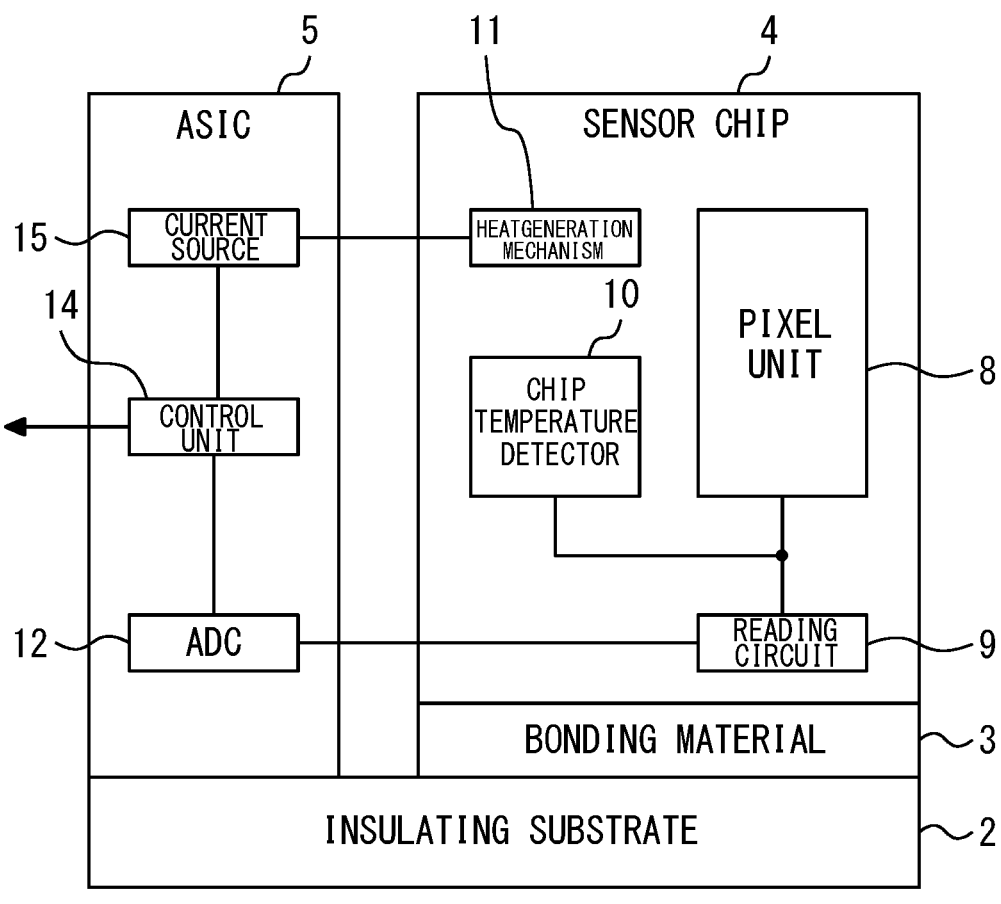
FIG. 11 is a diagram illustrating an internal configuration of an infrared sensor device according to an embodiment 5.

FIG. 11 is a diagram illustrating an internal configuration of an infrared sensor device according to an embodiment 5. Two terminals, i.e., a terminal that reads out a pixel output and a terminal that reads out temperature information are required in the embodiment 1. In the present embodiment, a reading circuit 9 not only reads out a pixel output of a pixel unit 8 and provides the pixel output to a control unit 14 but also reads out an output of a chip temperature detector 10 and provides the output to the control unit 14.

When the pixel output of the pixel unit 8 and the output of the chip temperature detector 10 are thus read out by the same reading circuit 9, the pixel output and the temperature information can be read out by the same terminal. The number of A-D converters that each converts an output signal of the reading circuit 9 into a digital signal and provides the digital signal to the control unit 14 can be set to one. Therefore, a configuration of the infrared sensor device is simplified, resulting in reduced power consumption and cost.

Embodiment 6

Figure 12:
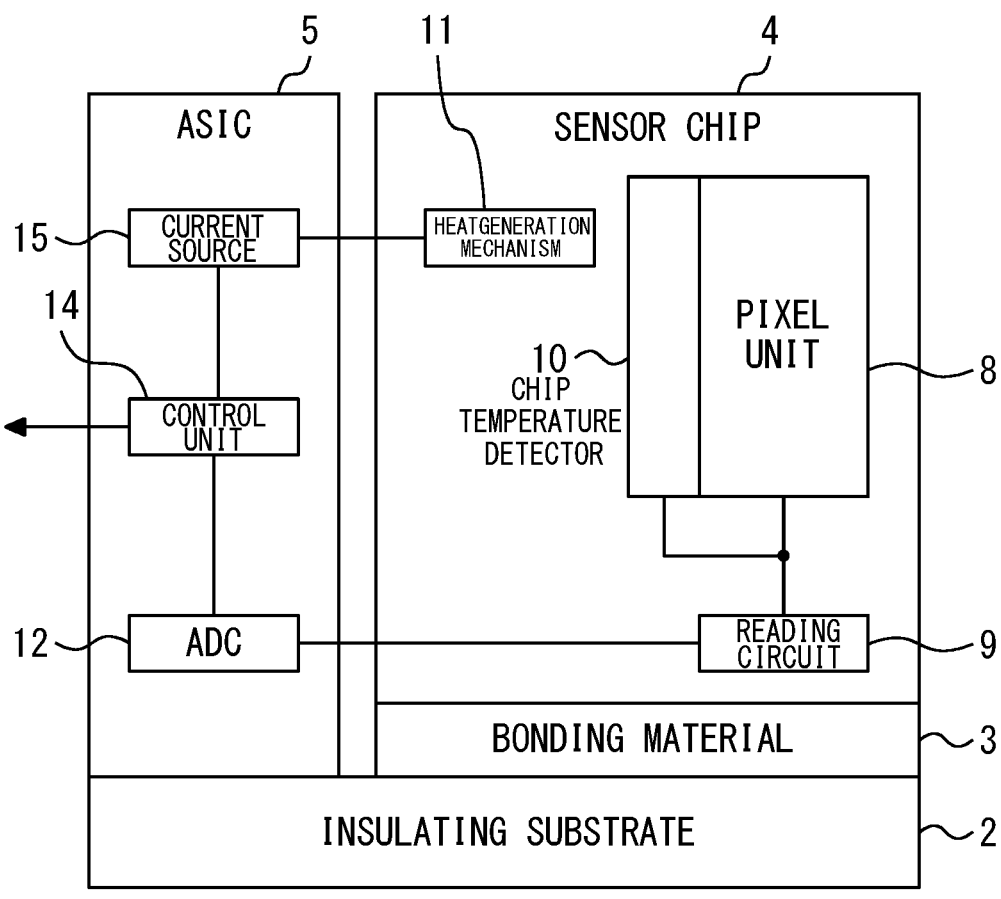
FIG. 12 is a diagram illustrating an internal configuration of an infrared sensor device according to an embodiment 6.

FIG. 12 is a diagram illustrating an internal configuration of an infrared sensor device according to an embodiment 6. In the present embodiment, a chip temperature detector 10 is a diode or a resistor that has not been hollow insulated from a silicon substrate 19, and is arranged in an inner portion or an outer peripheral portion of a pixel unit 8. Specifically, this structure is identical to the structure illustrated in FIG. 4 except that there is no cavity 20.

Figure 13:
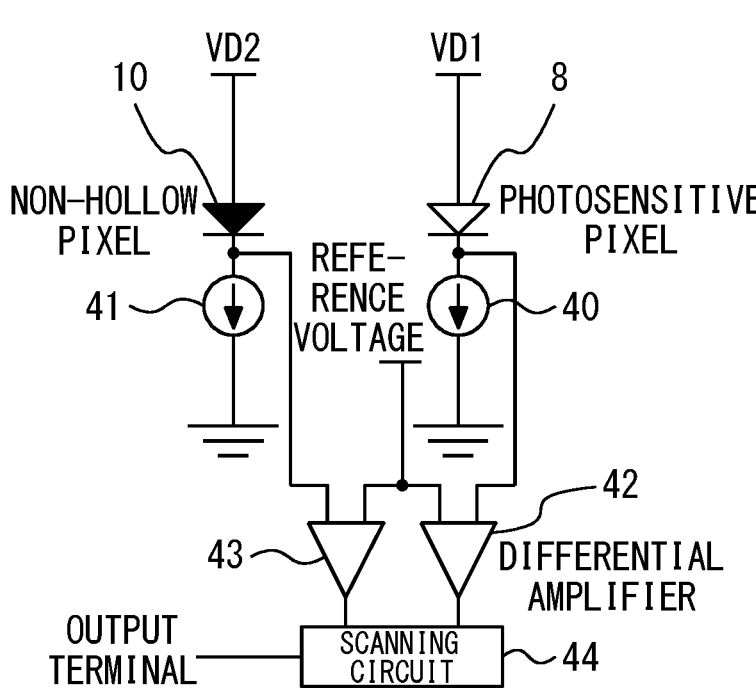
FIG. 13 is a circuit diagram illustrating an example of a sensor chip according to the embodiment 6.

FIG. 13 is a circuit diagram illustrating an example of a sensor chip according to the embodiment 6. The pixel unit 8 has a photosensitive pixel, and has its anode supplied with a voltage VD1 and has its cathode grounded via a current source 40. The chip temperature detector 10 is a non-hollow pixel, and has its anode supplied with a voltage VD2 and has its cathode grounded via a current source 41. A reference voltage is applied to respective first inputs of differential amplifiers 42 and 43. A cathode voltage of the pixel unit 8 is input to a second input of the differential amplifier 42. A cathode voltage of the chip temperature detector 10 is input to a second input of the differential amplifier 43. A scanning circuit 44 outputs respective output signals of the differential amplifiers 42 and 43 to an ASIC 5 via an output terminal of a sensor chip 4.

Figure 14:
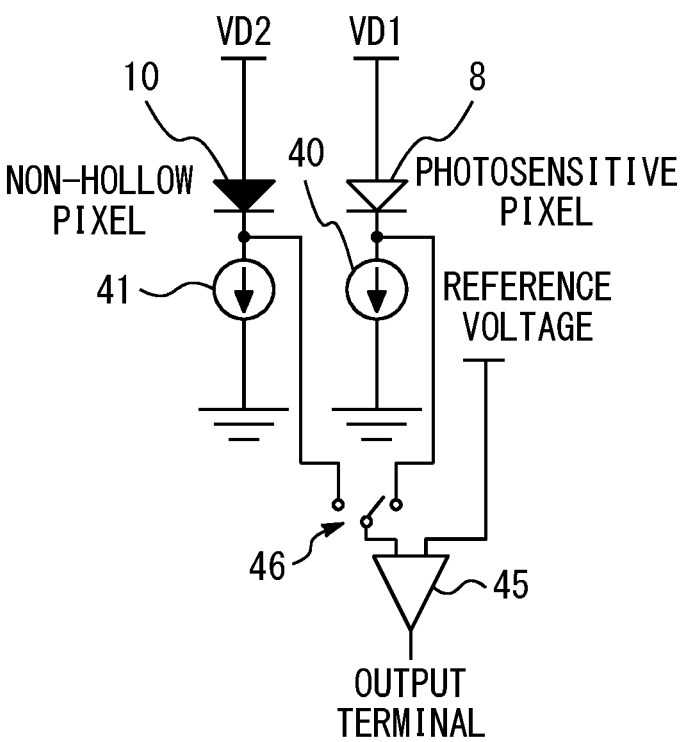
FIG. 14 is a circuit diagram illustrating another example of the sensor chip according to the embodiment 6.

FIG. 14 is a circuit diagram illustrating another example of the sensor chip according to the embodiment 6. A reference voltage is applied to a first input of a differential amplifier 45. A switch 46 selects one of a cathode voltage of the pixel unit 8 and a cathode voltage of the chip temperature detector 10 and provides the selected cathode voltage to a second input of the differential amplifier 45. An output signal of the differential amplifier 45 is output to the ASIC 5 via the output terminal of the sensor chip 4.

As described in the embodiment 1, the pixel unit 8 in the infrared sensor is a diode or a resistor that has been hollow insulated from the silicon substrate 19. A diode or a resistor of the chip temperature detector 10 has the same configuration as that of the diode or the resistor of the pixel unit 8 except that it has not been hollow insulated, whereby a part of a manufacturing process can be shared therebetween. The chip temperature detector 10 can be configured by the diode or the resistor thereof not being hollow insulated, thereby making it possible to obtain a measurement result conforming to an actual temperature of the pixel unit 8.

Embodiment 7

Figure 15:
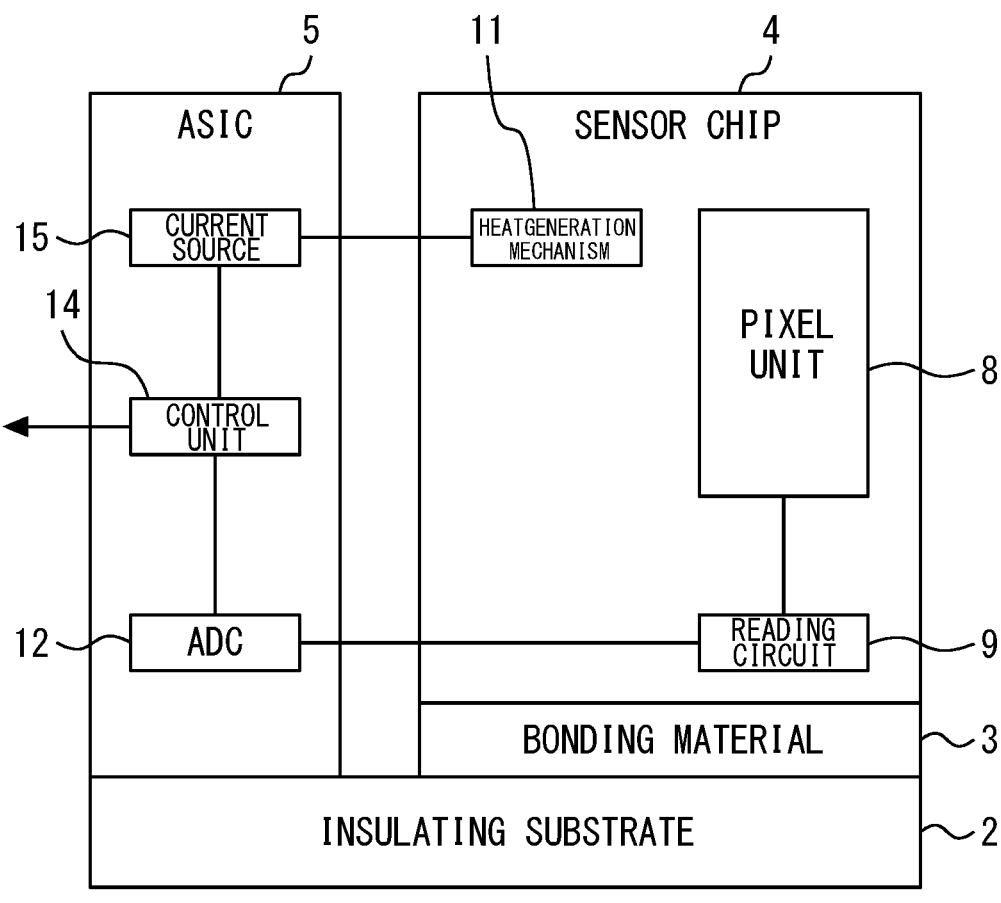
FIG. 15 is a diagram illustrating an internal configuration of an infrared sensor device according to an embodiment 7.
Figure 16:
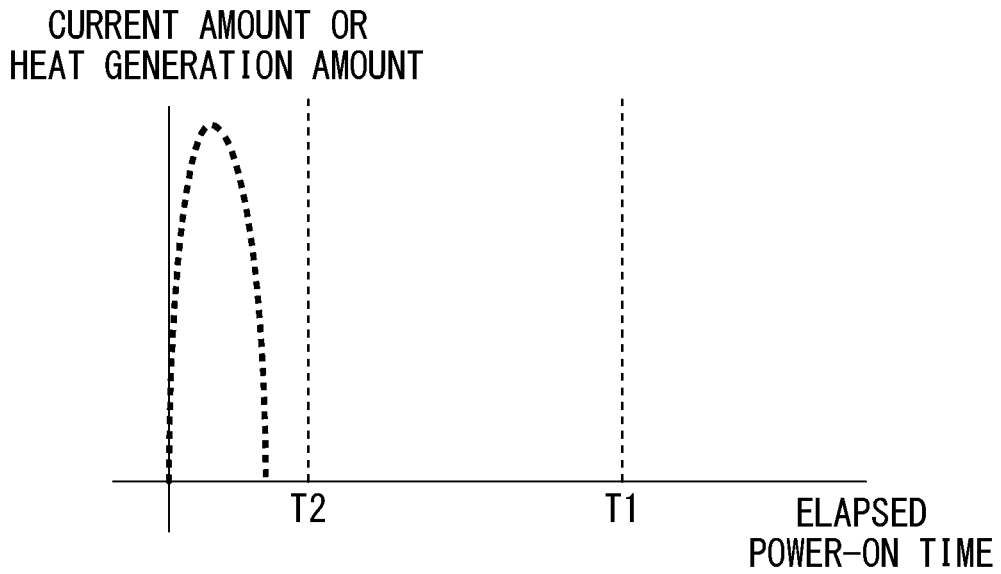
FIG. 16 is a diagram illustrating an amount of current or an amount of heat generation of a heat generation mechanism according to the embodiment 7.

FIG. 15 is a diagram illustrating an internal configuration of an infrared sensor device according to an embodiment 7. FIG. 16 is a diagram illustrating an amount of current or an amount of heat generation of a heat generation mechanism according to the embodiment 7. In the present embodiment, a control unit 14 measures a time period elapsed since power was supplied from a power supply 6 using a timer, and increases an amount of current to be supplied to a heat generation mechanism 11 in a predetermined time period, e.g., approximately several seconds to several ten of seconds and reduces the amount of current to be supplied to the heat generation mechanism 11 after the predetermined time period has elapsed. Accordingly, an amount of heat generation of the heat generation mechanism 11 increases for only the predetermined time period after the power is turned on.

Figure 17:
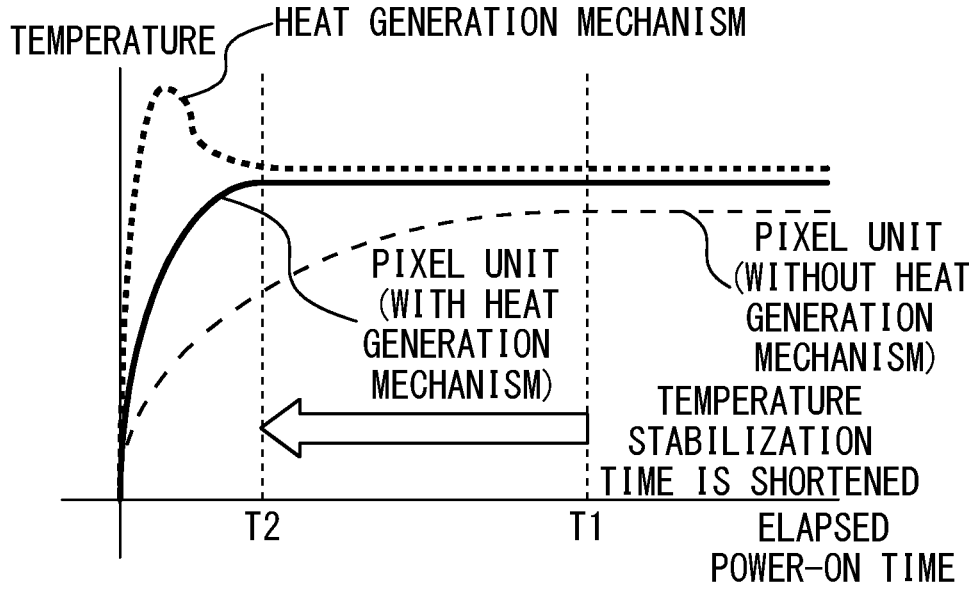
FIG. 17 is a diagram illustrating a change in temperature of a sensor chip according to the embodiment 7.

FIG. 17 is a diagram illustrating a change in temperature of a sensor chip according to the embodiment 7. The temperature of a pixel unit 8 gradually rises after the power is turned on. If there is no heat generation mechanism 11, a time period T1 is required until the temperature of the sensor chip 4 is stabilized. When the amount of heat generation of the heat generation mechanism 11 is increased for only the predetermined time period after the power is turned on, as in the present embodiment, a time period required until the temperature of the sensor chip 4 is stabilized can be shortened to a time period T2. This can result in shortening a time period elapsed until an output level and a characteristic of the infrared sensor device are stabilized since the infrared sensor device was started up.

Although there is provided no chip temperature detector 10 in the present embodiment, a method for controlling an amount of current in the present embodiment may be combined with the respective configurations in the embodiments 1 to 6 each including the chip temperature detector 10.

Embodiment 8

Figure 18:
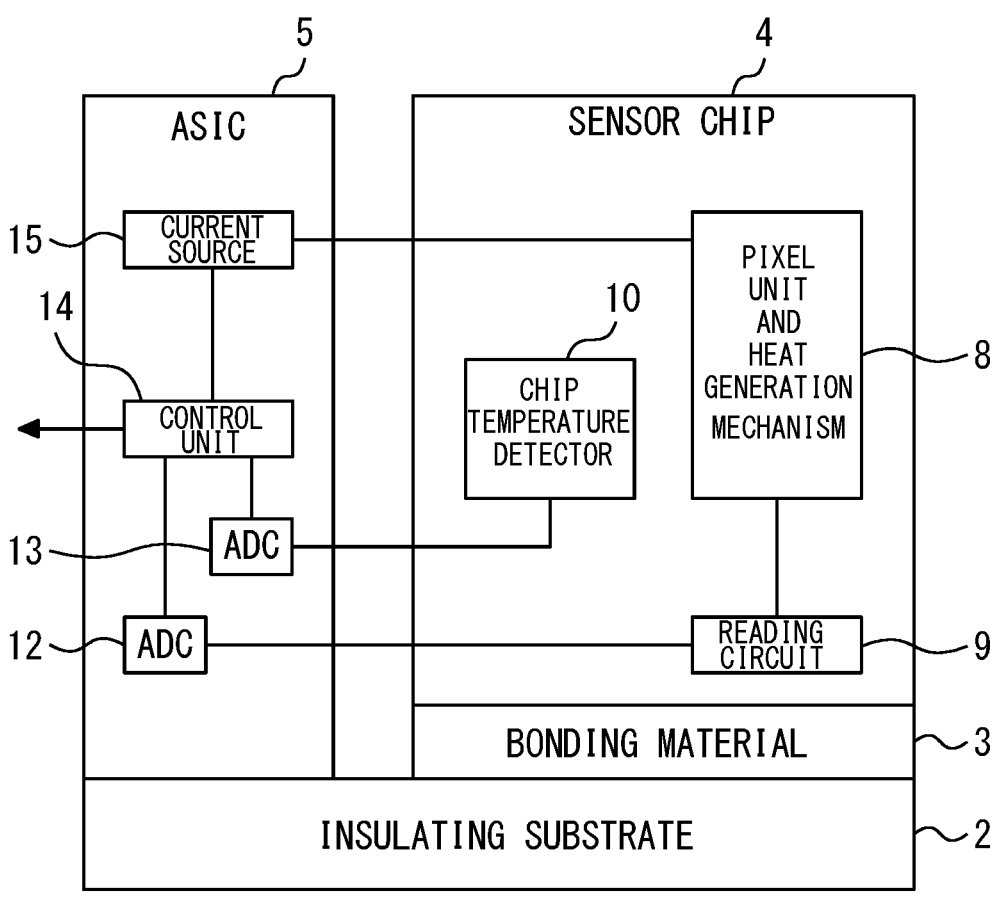
FIG. 18 is a diagram illustrating an internal configuration of an infrared sensor device according to an embodiment 8.

FIG. 18 is a diagram illustrating an internal configuration of an infrared sensor device according to an embodiment 8. Although the heat generation mechanism 11 is integrated with the sensor chip 4 in each of the embodiments 1 to 7, a pixel unit 8 also serves as a heat generation mechanism in the present embodiment.

Figure 19:
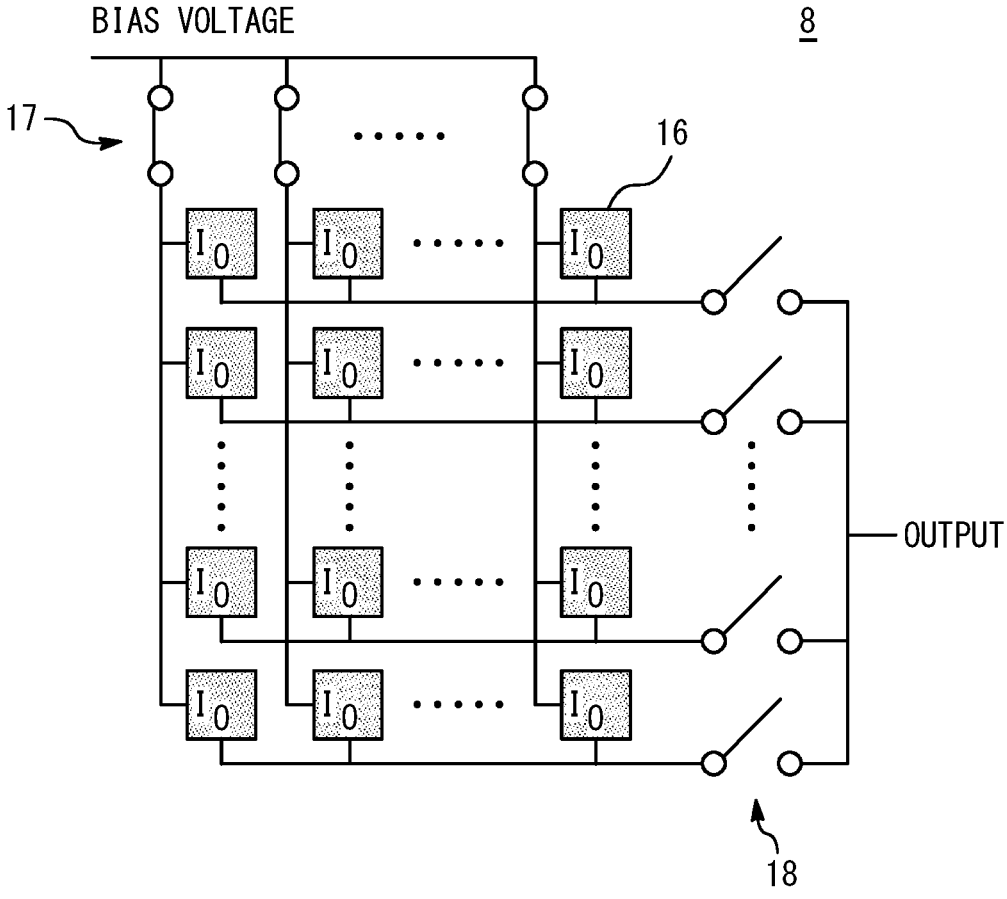
FIG. 19 is a diagram illustrating the pixel unit according to the embodiment 8.

FIG. 19 is a diagram illustrating the pixel unit according to the embodiment 8. A control unit 14 switches a column selection switch 17 and a row selection switch 18, to control a plurality of pixels 16. The control unit 14 causes a current to flow through only the pixels 16 in a selected column and reads out a current value of the pixel 16 in a selected row, as illustrated in FIG. 3, when outputting an infrared detection result. When such a heat image is scanned, the sensor chip 4 normally maintains a thermal equilibrium state.

The pixel 16 is a diode or a resistor, and thus generates heat when a current is caused to flow therethrough. The control unit 14 causes a current to flow through all the plurality of pixels 16, as illustrated in FIG. 19, to raise the temperature of the sensor chip 4 when an output of a chip temperature detector 10 is below a reference value. As a result, the temperature of the sensor chip 4 can be made constant. Therefore, an output level of the infrared sensor device becomes constant, resulting in stabilized image quality and characteristic. This makes it possible to shorten a time period elapsed until an output of the infrared sensor device is stabilized. Since a heat generation mechanism 11 need not be installed, resulting in reduced cost. Further, heat can be generated in a two-dimensional array shape, thereby making it easy to adjust the temperature of the entire sensor chip 4.

REFERENCE SIGNS LIST

1 infrared sensor device; 2 insulating substrate; 3 bonding material; 4 sensor chip; 8 pixel unit; 9 reading circuit; 10 chip temperature detector; 11 heat generation mechanism; 14 control unit; 16 pixel; 24 PN diode; 31,38 resistor; 39 substrate temperature detector

The invention claimed is:

1. An infrared sensor device comprising:
   an insulating substrate;
   a sensor chip bonded to the insulating substrate using a bonding material and having a pixel unit that detects an infrared ray;
   a heat generation mechanism integrated with the sensor chip; and
   a control unit provided on the insulating substrate and controlling an amount of current to be supplied to the heat generation mechanism,
   wherein the heat generation mechanism is a diode,
   a plurality of the heat generation mechanisms are arranged around the pixel unit in a surface of the sensor chip,
   the control unit individually controls an amount of current to be supplied to each of the plurality of heat generation mechanisms, and
   when the infrared sensor device is started up, the control unit makes an amount of current to be supplied to the heat generation mechanism arranged far from the control unit greater than an amount of current to be supplied to the heat generation mechanism arranged close to the control unit.

2. The infrared sensor device according to claim 1, wherein the heat generation mechanism is the diode that is not hollow insulated from a semiconductor substrate of the sensor chip.

3. The infrared sensor device according to claim 1, further comprising a chip temperature detector detecting temperature of the sensor chip,
   wherein the control unit controls an amount of current to be supplied to the heat generation mechanism in response to an output of the chip temperature detector.

4. The infrared sensor device according to claim 3, wherein the control unit supplies a current to the heat generation mechanism when an output of the chip temperature detector is below a reference value, and stops supplying a current to the heat generation mechanism when the output of the chip temperature detector exceeds the reference value.

5. The infrared sensor device according to claim 1, further comprising a substrate temperature detector that detects temperature of the insulating substrate,
   wherein the control unit controls an amount of current to be supplied to the heat generation mechanism in response to an output of the substrate temperature detector.

6. The infrared sensor device according to claim 1, wherein power is supplied to the sensor chip and the control unit from a power supply, and
   the control unit increases an amount of current to be supplied to the heat generation mechanism in a predetermined time period after the power was first supplied from the power supply.

7. The infrared sensor device according to claim 1, wherein
   when the infrared sensor device is started up, the control unit makes the amount of current to be supplied to the heat generation mechanism arranged far from the control unit greater than the amount of current to be supplied to the heat generation mechanism arranged close to the control unit for a predetermined period after the infrared sensor device is started up.

8. An infrared sensor device comprising:
   an insulating substrate;
   a sensor chip bonded to the insulating substrate using a bonding material and having a plurality of pixels that detect infrared rays;

a chip temperature detector detecting temperature of the sensor chip; and a control unit provided on the insulating substrate and controlling the plurality of pixels, wherein the plurality of pixels are diodes arranged in a matrix shape, the control unit causes a current to flow through only the pixels in a selected column and reads out a current value of the pixel in a selected row when outputting an infrared detection result, and the control unit causes a current to flow through all the plurality of pixels when an output of the chip temperature detector is below a reference value.

9. The infrared sensor device according to claim 8, wherein the control unit causes the current to flow through all the plurality of pixels when the output of the chip temperature detector is below the reference value to make an output level of the infrared sensor device become constant.

\* \* \* \* \*